(12) United States Patent  
Griffith et al.

(10) Patent No.: US 8,364,298 B2  
(45) Date of Patent: Jan. 29, 2013

(54) FILTERING APPLICATION SOUNDS

(75) Inventors: William Arthur Griffith, Austin, TX (US); Indran Naick, Austin, TX (US); Wing Sent, San Diego, CA (US)

(73) Assignee: International Business Machines Corporation, Armonk, NY (US)

( * ) Notice: Subject to any disclaimer, the term of this patent is extended or adjusted under 35 U.S.C. 154(b) by 853 days.

(21) Appl. No.: 12/511,176

(22) Filed: Jul. 29, 2009

(65) Prior Publication Data

US 2011/0029105 A1    Feb. 3, 2011

(51) Int. Cl.
*G06F 17/00*     (2006.01)

(52) U.S. Cl. .... 700/94; 379/3; 379/406.01; 379/406.02; 379/406.05; 379/406.15; 379/406.16; 370/286; 370/287; 370/289; 370/290; 370/291; 381/71.1; 381/71.7; 381/71.9; 381/71.12; 381/71.13; 381/94.1; 381/94.5; 715/716; 715/727

(58) Field of Classification Search ............. 700/94
See application file for complete search history.

(56) References Cited

U.S. PATENT DOCUMENTS

| | | | |
|---|---|---|---|
| 5,687,285 A | 11/1997 | Katayanagi et al. | |
| 5,993,769 A | 11/1999 | Pinnavaia et al. | |
| 6,009,519 A * | 12/1999 | Jones et al. | 713/1 |
| 6,078,742 A * | 6/2000 | Chow | 703/25 |
| 6,175,634 B1 | 1/2001 | Graumann | |
| 6,905,414 B2 * | 6/2005 | Danieli et al. | 463/42 |
| 7,043,028 B2 | 5/2006 | Leske et al. | |
| 7,142,678 B2 * | 11/2006 | Falcon | 381/107 |
| 7,706,903 B2 * | 4/2010 | Champion et al. | 700/94 |
| 7,769,162 B2 * | 8/2010 | Knutson et al. | 379/406.01 |
| 8,180,064 B1 * | 5/2012 | Avendano et al. | 381/73.1 |
| 8,219,394 B2 * | 7/2012 | Flaks et al. | 704/227 |
| 2004/0161101 A1 * | 8/2004 | Yiu et al. | 379/406.01 |
| 2006/0168114 A1 * | 7/2006 | Glatron et al. | 709/218 |
| 2006/0210097 A1 * | 9/2006 | Yerrace et al. | 381/119 |
| 2006/0285701 A1 * | 12/2006 | Chumbley et al. | 381/104 |
| 2008/0082326 A1 | 4/2008 | Venkataraman et al. | |
| 2008/0150777 A1 * | 6/2008 | Rangan et al. | 341/143 |
| 2008/0224779 A1 | 9/2008 | Lin | |
| 2009/0070674 A1 * | 3/2009 | Johnston | 715/716 |
| 2009/0197558 A1 * | 8/2009 | Shiotsu et al. | 455/296 |
| 2010/0262656 A1 * | 10/2010 | Alexandrov et al. | 709/204 |
| 2011/0051954 A1 * | 3/2011 | Thomsen et al. | 381/93 |
| 2011/0091049 A1 * | 4/2011 | Salvetti et al. | 381/93 |

* cited by examiner

*Primary Examiner* — Paul McCord

(74) *Attorney, Agent, or Firm* — Jerry W. Herndon

(57) ABSTRACT

A system, method, and program product are provided for filtering sound from a selected application on a computer without interrupting voice communications on the computer. The method comprises: monitoring a selected program for an outgoing digital audio signal from a selected application; detecting said digital audio signal; and filtering an analog microphone input with the digital audio signal.

14 Claims, 4 Drawing Sheets

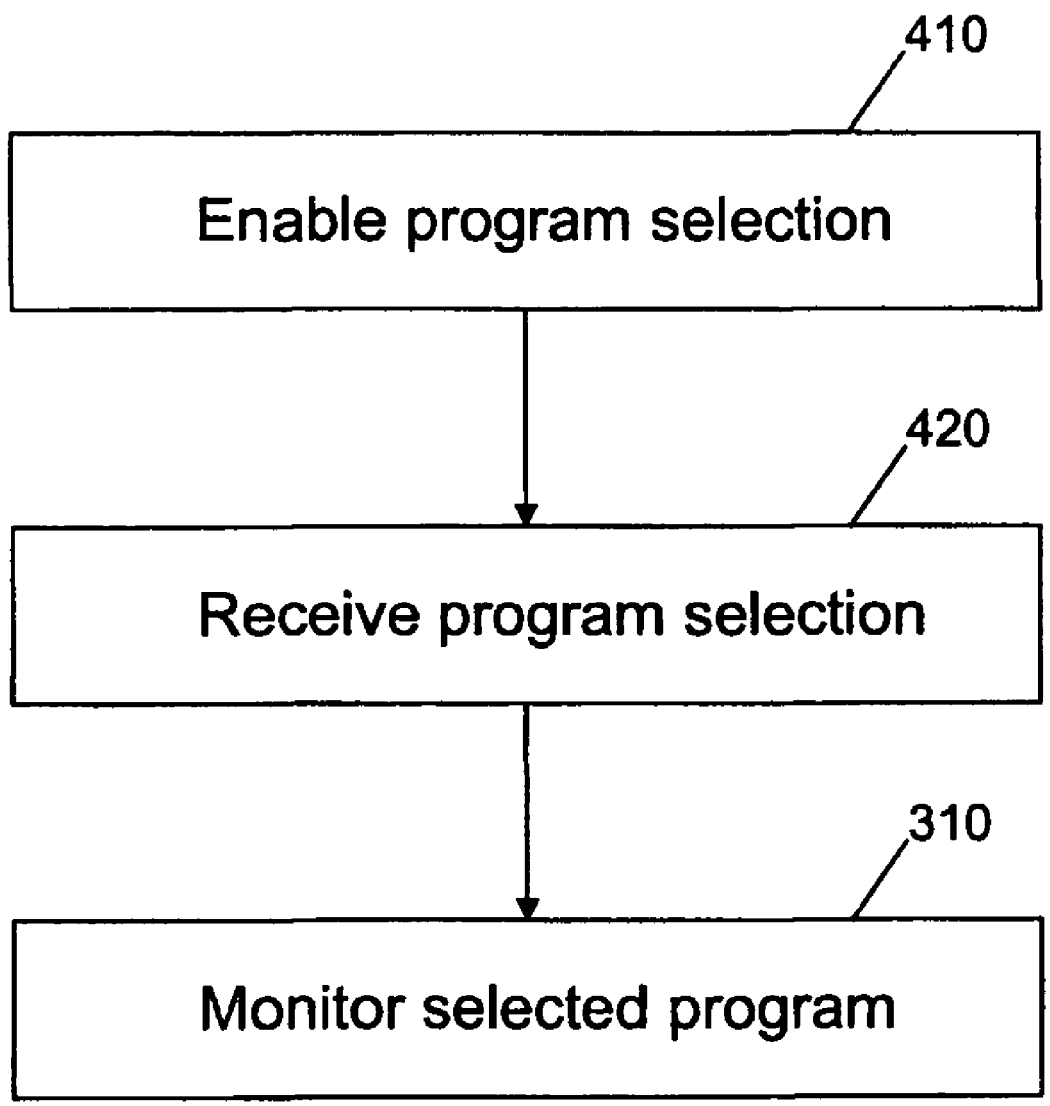

FILTERING APPLICATION SOUNDS

FIELD OF THE INVENTION

The invention relates to the field of voice communication through a computer system and more particularly to a system, method, and computer program product for filtering sounds from a selected application generated at local speakers without interrupting voice communications.

BACKGROUND

Many computer users use Voice over Internet Protocol (VOIP) phones for voice communication through a networked computer. This "soft phone" technology may be used while other applications are running on the networked computer, providing cost-effective voice communications through an existing networked computer.

Many computer applications produce an alarm or pop-up sound to alert a user to a message, appointment, or other activity that requires the user's attention. Often while on a call, such as a conference call in a business environment, the entire listening community will hear an alarm or pop-up sound indicating a message or appointment for one of the participants. To prevent broadcasting alarms and pop-up sounds, users are sometimes asked to mute their soft phones. However, users can not speak on a conference call when their soft phone is muted. Moreover, sounds from other applications may be broadcast when a user un-mutes his/her soft phone to speak. Alternatively, the local speakers for a user's networked computer may be muted; however, a user may want to hear certain alarms or pop-up sounds.

Similarly, a user may wish to listen to background music played through a networked computer. However, when speaking on a soft phone through the computer, the user may not wish to have the background music transmitted over the soft phone.

SUMMARY

A computer user may wish to selectively filter a sound signal from a microphone input. For example, a computer user has to deliver a presentation over the web using Voice Over IP (VOIP). During the web meeting, not only does the user have to speak, but the user also has to present a pre-recorded video demonstration with narration. In this case, the user wants the sound from the video to be transmitted through the microphone so that the audience can hear it. However, the user would want to disable other sounds from his/her computer such as those from email notification and instant messages. The present invention addresses this specific situation by allowing the user to select specific applications and then filter out application sounds generated by selected applications (e.g. email program and instant message applications).

According to an embodiment of the present invention, a method is provided for filtering sounds from selected applications on a computer without interrupting voice communications on the computer. The computer comprises a speaker for providing sounds generated by applications executing on the computer and a microphone for inputting sounds, particularly a voice stream, into applications executing on the computer (such as voice communication programs like Voice Over Internet Protocol (VOIP)). A processor in the computer executes a program instruction to monitor a selected program for an outgoing digital audio signal corresponding to a sound to be filtered. This monitoring occurs at the Random Access Memory (RAM) of the computer. The processor executing a program instruction detects the digital audio signal as it is sent to a sound card in the computer. In response to detecting the digital audio signal, the computer filters an analog microphone input with the digital audio signal. The filtered signal, with the application sound filtered out, is then used in a voice communication application. According to one embodiment, the filtering step comprises: converting the digital signal to an analog signal, inverting the analog signal, and combining the inverted analog signal with the analog microphone input. The application to be monitored may be selected by the user through a user interface.

According to another embodiment, computer system is provided for selectively filtering application sounds without interrupting voice communications. The system comprises a processor executing an audio communication program and at least one additional program of instructions from a computer readable storage device through a random access memory that is interconnected with the processor. The computer readable storage device stores the audio communication program and said at least one additional program, and portions of the programs are loaded into RAM as needed to execute them. A sound card is interconnected with the processor and the random access memory, a microphone and a speaker. The sound card processes audio signals into and from the audio communication program and the at least one additional program. A monitoring program executed by the processor through RAM monitors a selected program to detect an outgoing digital audio signal corresponding to a sound to be filtered. A filter filters an analog input from the microphone with the digital audio signal. According to one embodiment, the filter comprises a digital to analog converter and an inverter, and feeds the inverted signal to the same analog to digital converter where the microphone input is fed.

According to another embodiment, a computer program product is provided comprising a computer readable storage media having encoded thereon a program of instructions. The program of instructions comprises: instructions for monitoring a selected program for an outgoing digital audio signal corresponding to a sound to be filtered; instructions for detecting said digital audio signal; and instructions for filtering an analog microphone input with the digital audio signal.

BRIEF DESCRIPTION OF THE DRAWINGS

The features and advantages of the invention will be more clearly understood from the following detailed description of the preferred embodiments when read in connection with the accompanying drawing. Included in the drawing are the following figures:

FIG. 4 is a flow diagram of a method for selecting a program to monitor according to a sample embodiment of the present invention.

DETAILED DESCRIPTION

The present invention provides a method, apparatus and program product for filtering sound from a selected application without interrupting voice communications according to a sample embodiment of the present invention. A user may select one or more applications to be filtered on a networked computer. The selected applications are monitored, and when audio signals generated by the selected application are detected, the signal is converted to an analog signal, inverted, and combined with a microphone input for the computer. The signal generated by the selected application is fed to local speakers for the computer and drives the speakers to produce the sound from the application. However the inverted signal cancels the signal from the application sound which is picked up by the microphone from the speakers.

Figure 1:
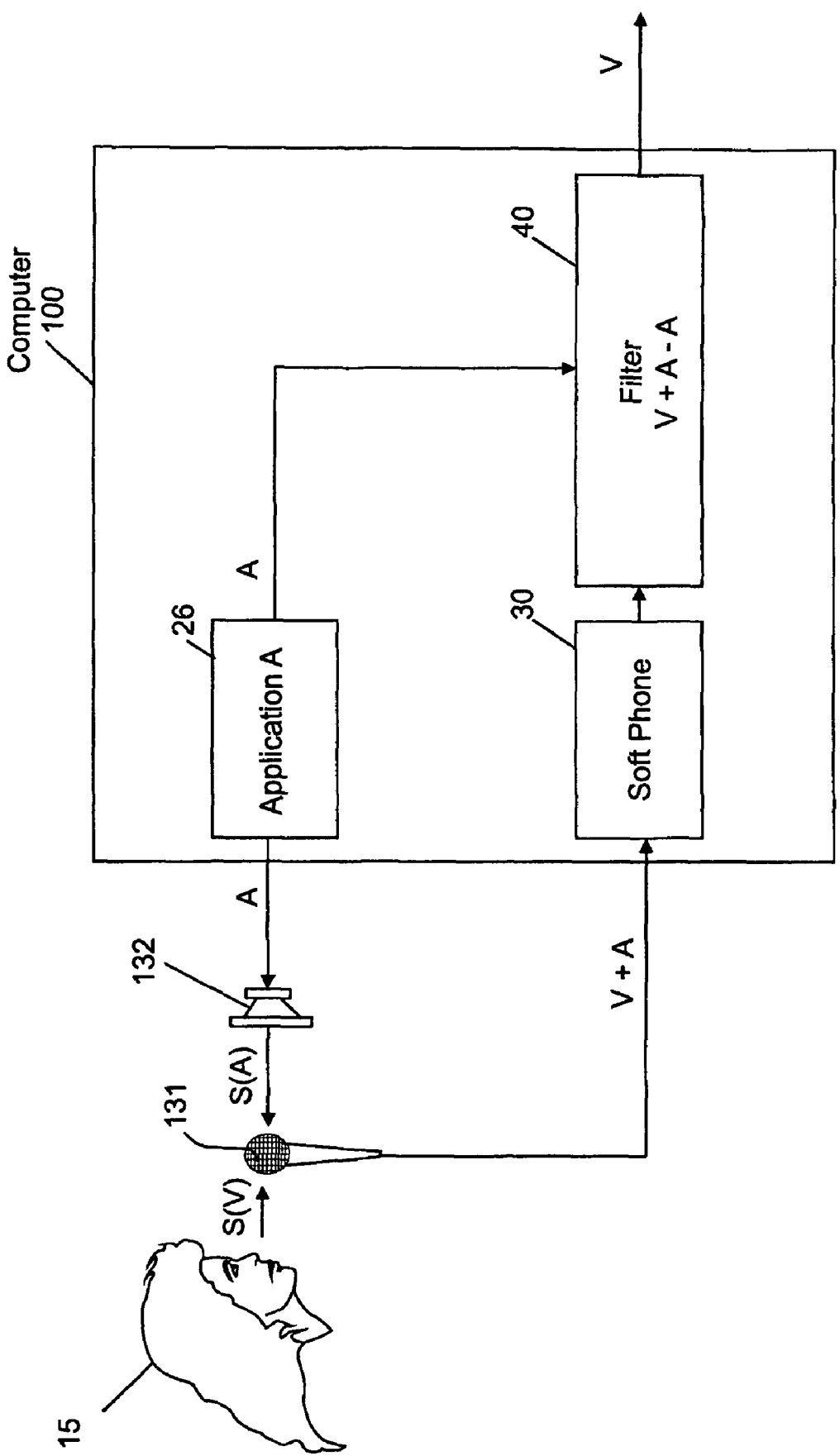
FIG. 1 is block diagram showing a method for allowing application sounds without interrupting voice communications according to a sample embodiment of the present invention.

As shown in FIG. 1, a computer system 100 executes a monitored application 26, which generates an audio signal A within the computer system 100. As shown, the audio signal is used to generate an application sound S(A) through one or more speakers 132, which is audible to a computer user 15. The computer system 100 also executes a soft phone application 30 which captures a voice stream S(V) through a microphone 131 as a voice signal V. The microphone 131 also captures the application sound S(A) with the voice stream S(V), so that the microphone input 9 to the soft phone 30 comprises a voice stream signal V and an application sound signal A.

According to one embodiment of the present invention, the computer system 100 further comprises a filter 40. The filter 40 uses the audio signal A to cancel the application sound A captured by microphone 131 and fed to the soft phone 30. As a result, the output from the computer system 100 is the voice stream signal V free from the application sound signal A from the monitored application 26.

Figure 2:
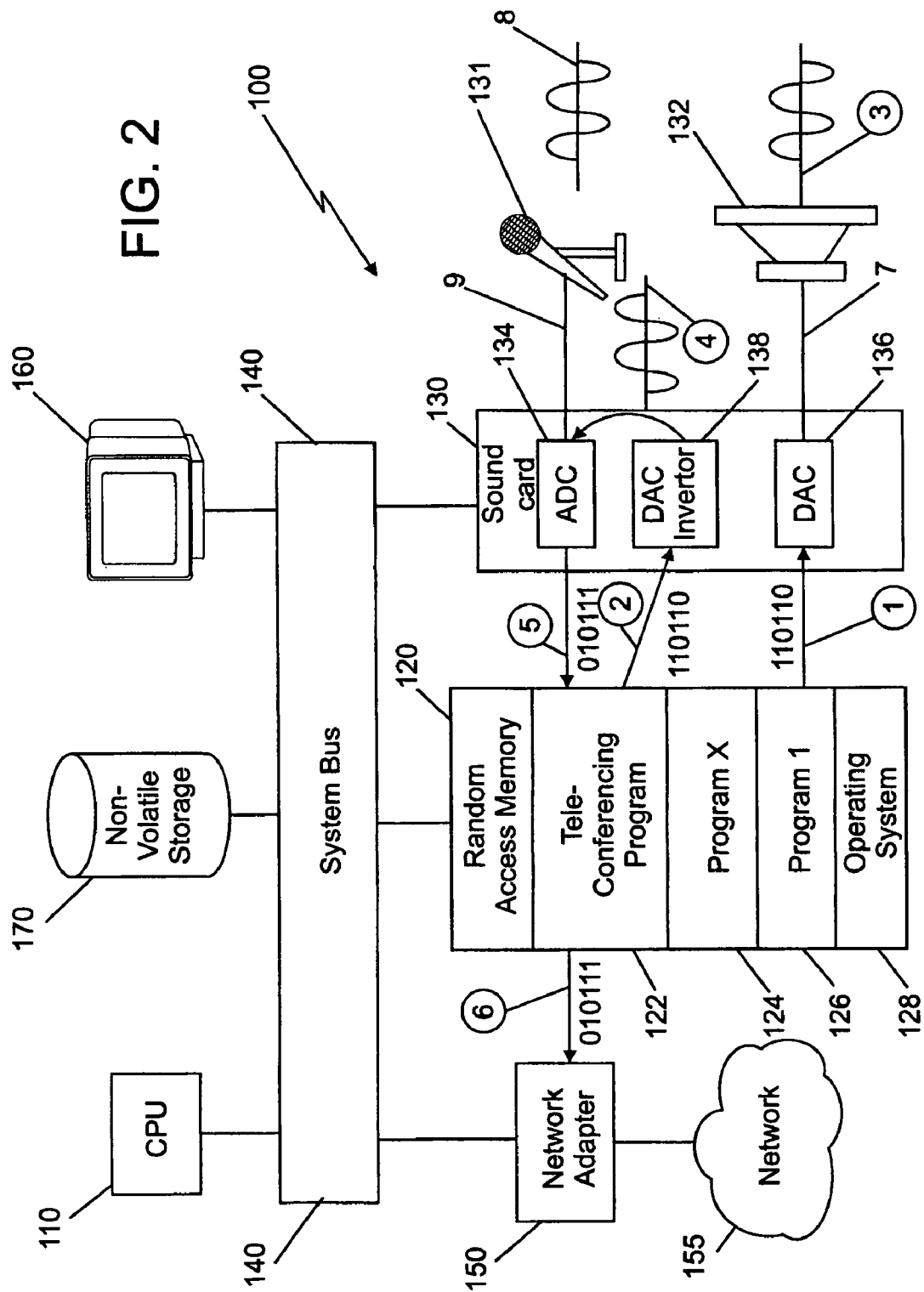
FIG. 2 is a block diagram of a computer system for filtering sound from a selected application without interrupting voice communications according to a sample embodiment of the present invention.

A computer system 100 according to one embodiment of the invention is shown in FIG. 2. Although a networked general purpose computer is illustrated and described herein, it should be understood that the scope of the present invention encompasses various computing devices, including: a personal digital assistant (PDA), a mobile computing device, a smart phone, or any other computing device suitable for running applications and providing voice communication.

The computer system 100 comprises one or more central processing units (processors) 110 (collectively or generically referred to as processor(s) 101). In one embodiment, each processor 110 may include a reduced instruction set computer (RISC) microprocessor. The processor 110 is interconnected with a Random Access Memory (RAM) 120 via a system bus 140. The processor 110 executes one or more programs that are loaded onto RAM 120. In the illustrated embodiment, a teleconferencing program 122, a non-selected program 124, a selected program 126, and an operating system 128 are loaded onto RAM 120. Examples of operating systems that may be supported by the computer system 100 include Windows 95, Windows 98, Windows NT 4.0, Windows XP, Windows 2000, Windows CE, Windows Vista, Macintosh, Java, LINUX, and UNIX, or any other suitable operating system.

The computer system 100 further comprises a sound card 130 interconnected with the processor 110 and RAM 120 through the system bus 140 and connected to a local speaker 132 and a microphone 131. The sound card 130 comprises a digital to analog converter (DAC) 136. The sound card 130 receives digital audio signals from programs and feeds the signals to the DAC 136. The DAC 136 converts the digital audio signals to analog audio signals and feeds them to the local speaker 132 to drive the local speaker 132 and produce sound. The computer system 100 may send the digital audio signals to the sound card 130 by creating a system interrupt, for example, calling the sound card.

The sound card 130 further comprises an Analog to Digital Converter (ADC) 134 which receives an analog audio signal from the microphone 131. The ADC 134 converts the analog audio signal into a digital audio signal and feed the digital audio signal to a program which is configured to receive a digital audio signal.

FIG. 2 further depicts a monitor 160, non-volatile storage 170, and a network adapter 150 coupled to the system bus 140. The network adapter 150 interconnects bus 140 with an outside network 155 enabling computer system 100 to communicate with other such systems. The network 155 may be a local-area network (LAN), a metro-area network (MAN), or wide-area network (WAN), such as the Internet or World Wide Web. Non-volatile storage 170 may be any non-volatile memory device, such as a hard drive, for example. Users of the computer system 100 can connect to the network 155 through any suitable network interface 150 connection, such as standard telephone lines, digital subscriber line, LAN or WAN links (e.g., T1, T3), broadband connections (Frame Relay, ATM), and wireless connections (e.g., 802.11(a), 802.11(b), 802.11(g)). Monitor 160 presents a graphical user interface (GUI) to a system user. Additional input/output (I/O) devices, storage, and other peripherals (not shown) may also be connected to the system bus 140 for providing various functions for the computer system 100 as is known in the art.

According to one sample embodiment, a monitored program 126 is executed from RAM 120 by the CPU 110. The monitored program 126 generates a digital audio application signal 1, and sends the digital audio application signal 1 to the sound card 130. A digital to analog converter (DAC) 136 on the sound card 130 converts the digital audio application signal 1 to an analog audio application signal 7 and sends the analog audio application signal 7 to the local speaker 132 to drive the local speaker 132 producing an application sound 3.

In the present sample embodiment, a teleconferencing program 122 is also executed from RAM 120 by the CPU 110. The microphone 131 receives a user sound 8, such as a voice stream, for example, which is intended for the teleconferencing program 122. However, the microphone also receives the application sound 3 from the local speaker 132. The microphone 131 sends an analog microphone input audio signal 9 to the sound card 130. The microphone input audio signal is a combined signal comprising both a user sound 8 component and an application sound 3 component.

Without the present invention, the analog microphone input audio signal 9 is converted to a digital combined audio signal 5 by the ADC 134 in the sound card 130. This digital combined audio signal is then sent by the sound card 130 to the teleconferencing program 122, and the teleconferencing program 122 sends the combined digital audio signal through the network adapter 150 to the network 155 and to other networked users participating in the conference call. These other participating network users then hear both the intended user sound 8 and the unintended application sound 3.

With the present invention, the teleconferencing program 122 monitors the monitored program 126. When the monitored program 126 sends a digital application audio signal 1 to the sound card 130, the teleconferencing program 122 detects the digital application audio signal 1 and duplicates the digital application audio signal and sends the duplicate digital application audio signal 2 to the sound card 130. The duplicate digital application audio signal is fed into a DAC-inverter 138, that is a DAC connected in series with an inverter. The inverter inverts the phase of a signal fed to it (i.e., shifts the phase of a signal by 180° or changes the signal to an antiphase of the original signal, which when combined with the original signal cancels the original signal (an effect known as phase cancellation)). The DAC-inverter 138 converts the duplicate digital application audio signal to an analog application audio signal and inverts it to an inverted analog application audio signal 4. The inverted analog application audio signal 4 is combined with the microphone audio input signal 9, such as, for example, by feeding the inverted analog application audio signal into the same ADC 134 as the microphone input audio signal 9.

The inverted analog application audio signal 4 cancels the application sound 3 portion of the microphone input audio signal 9. As a result of the cancellation, the sound card 130 sends a digital filtered audio signal 5 which comprises only the user sound 8 and application sounds from non-selected applications. In this example the digital filtered audio signal comprises only the user generated portion of the microphone input audio signal 9.

Figure 3:
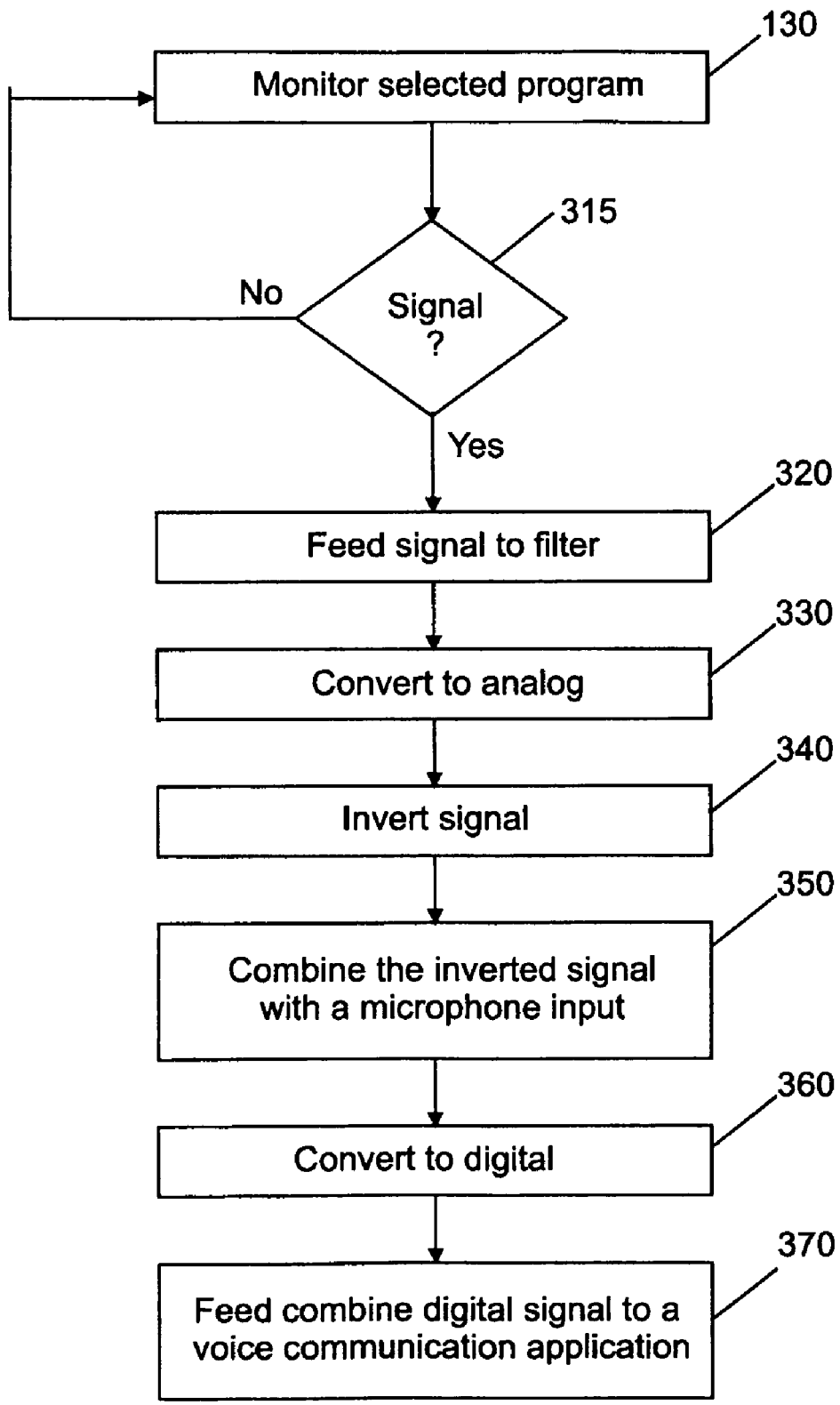
FIG. 3 is a flow diagram of a method for filtering sound from a selected application without interrupting voice communications according to a sample embodiment of the present invention.

FIG. 3 is a flow diagram of a method for filtering sound from a selected application without interrupting voice communications according to a sample embodiment of the present invention. In the illustrated embodiment, the teleconferencing program 122 monitors at least one selected program 126 for a digital audio output signal 1 from an application selected to be filtered (step 310). The application may be a scheduling program that generates an alarm to notify a user of a scheduled appointment, an instant messaging program that generates a notice signal from to notify a user of a message, or a music or news audio streaming program that generates an audio stream that a user is listening to in the background, or any other program sound that a user may want to hear but may not want to be communicated through an audio communication program, such as a soft phone or a conferencing program, or the like.

The monitoring step 310 may be performed by providing a listener to detect a sound card interrupt or a hooking program to intercept a sound card interrupt, for example. When the monitored program sends a digital audio signal 1 to the sound card 130, the listener or the hooking program detects the digital audio signal 1 (step 320).

While the monitoring step 310 and detection step 315 are performed by the teleconferencing program 122 in the illustrated embodiment and the foregoing description, monitoring and detection may also be performed by a separate program. Also the monitoring and detection instructions may be integral with a soft phone program 30 or other audio communication program.

When the teleconferencing program 122 detects an outgoing digital audio signal 1 from the monitored program 126 (Yes in decision block 315), the digital audio signal is fed to a DAC 136 on the sound card 130 where it is converted to an analog signal and fed to the speaker 132 to drive the speaker and provide the program sound 3. In this embodiment, the digital audio signal 2 is also fed to a filter 40 (step 320).

In the illustrated embodiment, the filter comprises a digital to analog converter and an inverter. The digital to analog converter converts the digital audio application signal 2 from the monitored program to an analog audio application signal (step 330). Then, the inverter inverts the analog signal (step 340). The inverted analog audio application signal 4 is then combined with an analog audio input 9 from a microphone 131 (step 350). The inverted analog application audio signal 4 and analog audio microphone input signal 9 from a microphone 131 may be combined by feeding both signals to the input of the analog to digital converter 134 in the sound card 130.

Because the inverted analog audio application signal 4 is the inverse of the portion of the microphone input 9 that is due to the program sound 3 being picked up by the microphone 131, they cancel each other. Thus, only the voice portion of the microphone input remains in the filtered audio signal. The analog filtered audio signal is then converted to a digital filtered audio signal 9 by the analog to digital converter 134 (step 360).

The digital filtered audio signal 9 is then fed from the sound card 130 to the teleconferencing program 122 (step 370). The teleconferencing program 122 may then send the digital filtered audio signal 9 (with the program sound filtered out of it) to other computers through a network adapter 150 and a network 155.

FIG. 4 is a flow diagram of a method for selecting a program to monitor according to a sample embodiment of the present invention. The program that is operating in RAM to monitor other programs for digital audio signals to be filtered interacts with a user 15 to select the program or programs to be monitored. In the illustrated embodiment, the teleconferencing program performs the selecting interactively with the user 15 through a user interface at monitor 160. However, the selection may be made by another audio communication program or by a separate program.

The teleconferencing 122 program enables a user to make program selection (step 410). That is, the user is enabled to select a program (or application) to be monitored. This may be accomplished, for example, by providing a function in a pull down menu, by presenting a listing of programs currently executing and allowing a program to be selected by hovering over it with a mouse and clicking the mouse, by opening a dialog box, or any other user action appropriate for selecting a program from among the at least one additional programs being executed from RAM.

The teleconferencing program 122 receives the program selection (step 420). That is, the teleconferencing program 122 receives an indication of the selected program, such as a data object corresponding to the selected program. In response to receiving the program selection, the teleconferencing program 122 begins to monitor the selected program (step 310), as described herein.

As disclosed herein, the computer system 100 may include machine readable instructions stored on machine readable media (for example, non-volatile storage 170) for monitoring a selected program, detecting audio signals from the selected program, and filtering an audio signal from a microphone input to cancel audio sounds from a selected program. The computer system may further provide machine readable instructions for capture and interactive display of information shown on the monitor 160. As discussed herein, the instructions are referred to as a program 120. The program may be produced using software development tools as are known in the art.

The invention can take the form of an entirely hardware embodiment, an entirely software embodiment or an embodiment containing both hardware and software elements. In an exemplary embodiment, the invention is implemented in software, which includes but is not limited to firmware, resident software, microcode, etc.

Furthermore, the invention may take the form of a computer program product accessible from a computer-usable or computer-readable medium providing program code for use by or in connection with a computer or any instruction execution system or device. For the purposes of this description, a computer-usable or computer readable medium may be any apparatus that can contain, store, communicate, or transport the program for use by or in connection with the instruction execution system, apparatus, or device.

The foregoing method may be realized by a program product comprising a machine-readable media having a machine-executable program of instructions, which when executed by a machine, such as a computer, performs the steps of the method. This program product may be stored on any of a variety of known machine-readable media, including but not limited to compact discs, floppy discs, USB memory devices, and the like. Moreover, the program product may be in the form of a machine readable transmission such as blue ray, HTML, XML, or the like.

The medium can be an electronic, magnetic, optical, electromagnetic, infrared, or semiconductor system (or apparatus or device). Examples of a computer-readable medium include a semiconductor or solid state memory, magnetic tape, a removable computer diskette, a random access memory (RAM), a read-only memory (ROM), a rigid magnetic disk an optical disk. Current examples of optical disks include compact disk-read only memory (CD-ROM), compact disk-read/write (CD-R/W) and DVD.

The preceding description and accompanying drawing are intended to be illustrative and not limiting of the invention. The scope of the invention is intended to encompass equivalent variations and configurations to the full extent of the following claims.

What is claimed is:

1. A method for filtering sounds from selected applications on a computer without interrupting voice communications on the computer, comprising:
    monitoring a selected program for an outgoing digital audio signal corresponding to a sound to be filtered;
    detecting said digital audio signal by intercepting a sound card interrupt from a selected program; and
    in response to detecting said digital audio signal, filtering an analog microphone input with the digital audio signal; wherein
    filtering an analog microphone input with the digital audio signal comprises:
    converting the digital signal to an analog signal;
    inverting said analog signal; and
    combining the inverted analog signal with said analog microphone input.

2. The method of claim 1, further comprising: converting the combined signal to a combined digital signal; and feeding said combined digital signal to a voice communication application.

3. The method of claim 1, further comprising:
    prompting a user to select a program for filtering; and
    filtering sound from the selected program from a network communication.

4. The method of claim 3, wherein said user is prompted through a user interface.

5. A computer system for filtering sounds from selected applications without interrupting voice communications comprising:
    a processor configured to execute an audio communication program and at least one additional program of instructions;
    a random access memory interconnected with said processor and configured to store said audio communication program and said at least one additional program;
    a sound card interconnected with said processor and said random access memory, the sound card configured to process audio signals into and from said audio communication program and said at least one additional program;
    a monitoring program executable by said processor to monitor a selected program to detect an outgoing digital audio signal from the selected program to be filtered by intercepting a sound card interrupt from a selected program; and
    a filter configured to filter an analog input with the digital audio signal: wherein the filter comprises:
    a digital to analog converter, configured to convert said digital audio signal to an analog audio signal; and
    an inverter, configured to invert said analog audio signal to provide an inverted analog signal; and the filter is further configured to combine said inverted analog signal with said input from said microphone.

6. The computer system of claim 5, wherein said monitoring program is integral with said audio communication program.

7. The computer system of claim 5, further comprising a monitor enabling a user to select a program for monitoring, allowing sounds from the selected program at a speaker and filtering sounds from the selected program from a network communication.

8. The computer system of claim 5, further comprising a network adapter configured to interconnect said computer system with other computer systems through a network.

9. The computer system of claim 5 wherein said sound card comprises a second digital to analog converter separate from said filter, the second digital to analog converter being configured to convert digital signals from said at least one additional program to analog signals and feeding said analog signals to said speaker.

10. A computer program product for filtering sounds from selected applications comprising a computer readable storage media having encoded thereon a program of instructions, comprising:
    instructions for monitoring a selected program for an outgoing digital audio signal corresponding to a sound to be allowed at a speaker and filtered from a network communication;
    instructions for detecting said digital audio signal by intercepting a sound card interrupt from a selected program; and
    instructions for filtering an analog microphone input with the digital audio signal; wherein
    the instructions for filtering an analog microphone input with the inverted analog signal comprise:
    converting the digital signal to an analog signal;
    inverting said analog signal; and
    combining the inverted analog signal with said analog microphone input.

11. The computer program product of claim 10, further comprising:
    instructions for converting the combined signal to a combined digital signal; and
    instructions for feeding said combined digital signal to a network communication application.

12. The computer program product of claim 10, further comprising:
    instructions for prompting a user to select a program for allowing a program sound at the local speaker and filtering sound from a network communication.

13. The computer program product of claim 12, wherein said user is prompted through a user interface.

14. The computer program product of claim 10 wherein the instructions for filtering an analog microphone input with the digital audio signal are integral with a program for audio communication.

* * * * *